United States Patent
Mayers et al.

(10) Patent No.: US 10,464,846 B2
(45) Date of Patent: Nov. 5, 2019

(54) METHOD FOR PRODUCTION OF ACOUSTICAL PANELS

(71) Applicant: USG INTERIORS, LLC, Chicago, IL (US)

(72) Inventors: Thomas M. Mayers, Crystal Lake, IL (US); Wei Xu, Vernon Hills, IL (US); Martin W. Brown, Lancaster, KY (US)

(73) Assignee: USG INTERIORS, LLC, Chicago, IL (US)

( * ) Notice: Subject to any disclaimer, the term of this patent is extended or adjusted under 35 U.S.C. 154(b) by 134 days.

(21) Appl. No.: 15/680,074

(22) Filed: Aug. 17, 2017

(65) Prior Publication Data

US 2019/0055162 A1   Feb. 21, 2019

(51) Int. Cl.
| | |
|---|---|
| C04B 26/28 | (2006.01) |
| C04B 14/46 | (2006.01) |
| C04B 24/38 | (2006.01) |
| C04B 14/18 | (2006.01) |
| C04B 111/52 | (2006.01) |
| C04B 111/00 | (2006.01) |

(52) U.S. Cl.
CPC ............ C04B 26/285 (2013.01); C04B 14/18 (2013.01); C04B 14/46 (2013.01); C04B 24/383 (2013.01); C04B 2111/00603 (2013.01); C04B 2111/00612 (2013.01); C04B 2111/52 (2013.01)

(58) Field of Classification Search
CPC ..... C04B 14/46; C04B 26/285; C04B 14/185; C04B 20/0048; C04B 18/241; C04B 14/18; C04B 2111/52; C04B 26/28; C04B 24/383; C04B 2111/00603; D21F 11/02; D21H 13/40; D21H 17/28; D21H 23/14; E04B 1/8409; E04B 1/99; D21J 1/00; D21J 1/20; D21J 1/08; C03C 13/06; Y10S 264/63
See application file for complete search history.

(56) References Cited

U.S. PATENT DOCUMENTS

| | | | | | |
|---|---|---|---|---|---|
| 1,769,519 | A | * | 7/1930 | King ..................... | C04B 26/285 106/124.51 |
| 3,379,608 | A | * | 4/1968 | Wendt ................... | C04B 26/285 162/145 |
| 3,658,633 | A | * | 4/1972 | Jumentier ............... | C04B 26/02 156/62.4 |
| 3,979,254 | A | * | 9/1976 | McIntyre .................. | D21F 1/02 162/299 |
| 4,153,503 | A | * | 5/1979 | Booth ....................... | D21J 1/00 162/123 |

(Continued)

FOREIGN PATENT DOCUMENTS

EP          0985762 A1 *   3/2000   ............... D21F 1/02

*Primary Examiner* — Jose A Fortuna
(74) *Attorney, Agent, or Firm* — Marshall, Gerstein & Borun LLP (57) ABSTRACT

A method of decreasing the water load needed to form a fibrous panel. The process includes admixing a mineral wool, a cellulose, and a binder to provide a pre-mixed slurry, admixing a mineral filler with water to provide a mineral filler slurry, admixing the pre-mixed slurry and the mineral filler slurry to form a dispersion, flowing the dispersion onto a foraminous support wire to provide a green board, dewatering the green board to form a dewatered green board and drying the dewatered green board to provide a fibrous panel.

21 Claims, 4 Drawing Sheets

(56) References Cited

U.S. PATENT DOCUMENTS

| | | | | |
|---|---|---|---|---|
| 4,789,430 A * | 12/1988 | Fredenucci | | D21H 13/40 |
| | | | | 162/145 |
| 4,911,788 A * | 3/1990 | Pittman | | B28B 1/526 |
| | | | | 162/145 |
| 4,963,228 A * | 10/1990 | Steen | | D21F 1/02 |
| | | | | 162/336 |
| 5,071,511 A * | 12/1991 | Pittman | | C04B 26/285 |
| | | | | 162/145 |
| 5,250,153 A * | 10/1993 | Izard | | C04B 24/383 |
| | | | | 162/152 |
| 5,277,762 A | 1/1994 | Felegi, Jr. et al. | | |
| 5,560,807 A * | 10/1996 | Hauser | | D21F 1/02 |
| | | | | 162/158 |
| 5,911,818 A * | 6/1999 | Baig | | C04B 14/185 |
| | | | | 106/122 |
| 6,117,272 A * | 9/2000 | Heinzmann | | D21F 1/02 |
| | | | | 162/198 |
| 6,149,831 A | 11/2000 | DePorter et al. | | |
| 6,443,256 B1 * | 9/2002 | Baig | | B32B 5/26 |
| | | | | 181/286 |
| 8,337,976 B2 | 12/2012 | Mayers et al. | | |
| 2002/0096278 A1 * | 7/2002 | Foster | | B44C 5/04 |
| | | | | 162/141 |
| 2008/0230194 A1 * | 9/2008 | Matula | | B01F 3/0865 |
| | | | | 162/166 |
| 2008/0299413 A1 * | 12/2008 | Song | | B28B 19/0092 |
| | | | | 428/689 |
| 2009/0126886 A1 * | 5/2009 | Englert | | D21H 11/20 |
| | | | | 162/151 |
| 2009/0260918 A1 * | 10/2009 | Cao | | E04B 1/86 |
| | | | | 181/290 |
| 2011/0251043 A1 * | 10/2011 | Brown | | C03B 37/06 |
| | | | | 501/36 |
| 2011/0297342 A1 * | 12/2011 | Nordstrom | | D21F 1/02 |
| | | | | 162/124 |
| 2015/0308111 A1 * | 10/2015 | Kemp | | B32B 5/26 |
| | | | | 181/290 |
| 2017/0204604 A1 * | 7/2017 | Frank | | E04B 1/8209 |
| 2018/0339935 A1 * | 11/2018 | Luan | | C03C 13/06 |
| 2019/0055162 A1 * | 2/2019 | Mayers | | C04B 26/285 |
| 2019/0063002 A1 * | 2/2019 | Ramaratnam | | D21F 11/145 |

* cited by examiner

PRIOR ART

METHOD FOR PRODUCTION OF ACOUSTICAL PANELS

FIELD OF THE DISCLOSURE

The disclosure relates generally to a method of preparing a fibrous panel. More particularly, the disclosure relates to a method of preparing a fibrous panel including admixing a pre-mixed slurry with a mineral filler slurry in a headbox of a fibrous panel forming machine.

BACKGROUND

Acoustical panels (or tiles) are specifically designed systems that are intended to improve acoustics by absorbing sound and/or reducing sound transmission in an indoor space, such as a room, hallway, conference hall, or the like. Although there are numerous types of acoustical panels, a common variety of acoustical panel is generally composed of mineral wool fibers, fillers, colorants, and binders, as disclosed, for example, in U.S. Pat. No. 1,769,519, herein incorporated by reference in its entirety. These materials, in addition to a variety of others, can be employed to provide acoustical panels with desirable acoustical properties and other properties, such as color and appearance.

Figure 1:
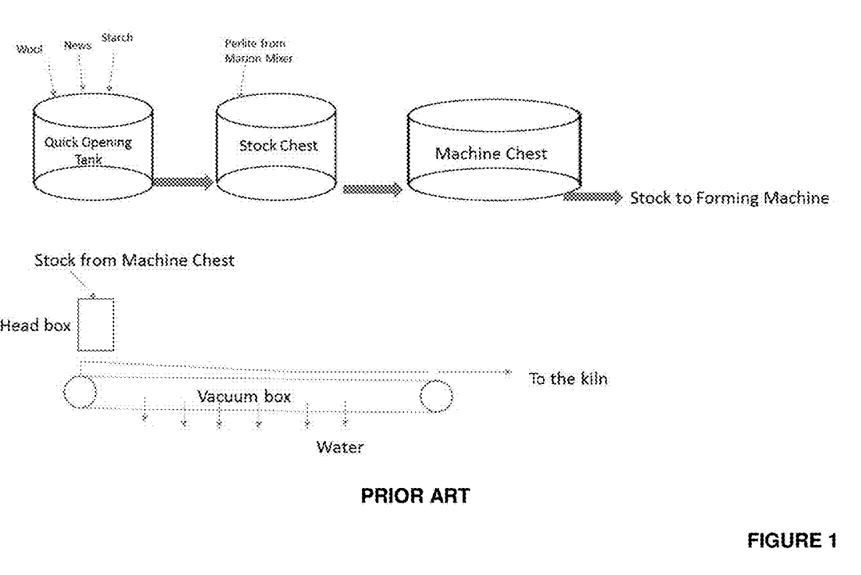
FIG. 1 is a diagram showing a prior art method of forming a fibrous panel.

Fibrous panels, such as the base mats for traditional ceiling tiles and acoustical panels, are typically made using a wet forming process, as illustrated in FIG. 1. The components that will make up the fibrous panel are mixed in water to form a dispersion in a series of chests (or tanks) before being formed into the fibrous panel. In a conventional fibrous panel production method, the binder, cellulose, and mineral wool are first combined in a quick opening tank and mixed with water to form a pre-mixed slurry. The pre-mixed slurry is then transferred to a stock chest, where a mineral filler slurry is injected into the stock chest from a separate mixing device. An embodiment of such a mixing device, as referred to hereinafter, is a continuous mixer, sometimes referred to as a MARION MIXER. This mineral filler slurry is formed from a dry mineral filler powder mixed with water. Additional components or additives, such as flocculents or colorants, can also be added to the composition in the stock chest. The stock, comprising binder, cellulose, mineral filler, mineral wool, and any other additive is then transferred to a machine chest where it is held and mixed for a significant period of time to assure the mixture is homogeneous. After thorough mixing, the stock is introduced to a headbox of a forming machine and flowed on a moving, porous support wire screen, such as that of a Fourdrinier machine, to form a green board. The green board is then dewatered, first by gravity and then vacuum suction means, and subsequently dried in a heated convection drying oven or kiln to form the lightweight fibrous panel.

The wet forming process as described is well known in the art as the traditional platform to economically produce ceiling tiles with moderate acoustical performance. One deficiency of this process is the large amount to water required to manufacture these ceiling tiles. In this process, the bulk of the weight, approximately 70%, of the tiles prior to entering the kiln is water. This water is evaporated in the drying stage, but requires a significant amount of energy and resources to dry.

SUMMARY OF THE INVENTION

One aspect of the disclosure provides a method of preparing a fibrous panel, including admixing a mineral wool, a cellulose, and a binder with water to provide a pre-mixed slurry, admixing a mineral filler with water to provide a mineral filler slurry, introducing the pre-mixed slurry to a headbox of a forming machine, injecting the mineral filler slurry into the headbox and mixing the mineral filler slurry with the pre-mixed slurry to form a dispersion, flowing the dispersion onto a foraminous support wire to provide a green board, dewatering the green board to form a dewatered green board, and drying the dewatered green board to provide a fibrous panel.

Further aspects and advantages will be apparent to those of ordinary skill in the art from a review of the following detailed description. While the methods and compositions are susceptible of embodiments in various forms, the description hereafter includes specific embodiments with the understanding that the disclosure is illustrative, and is not intended to limit the disclosure to the specific embodiments described herein.

DETAILED DESCRIPTION

The inventors have identified a new, more economical process of forming a fibrous panel that requires less water, providing ceiling tiles of substantially equivalent performance with less energy consumption.

The disclosure provides a method of preparing a fibrous panel, including admixing a mineral wool, a cellulose, and a binder with water to provide a pre-mixed slurry, admixing a mineral filler with water to provide a mineral filler slurry, introducing the pre-mixed slurry to a headbox of a forming machine, injecting the mineral filler slurry to the headbox and mixing the mineral filler slurry with the pre-mixed slurry within the headbox to form a dispersion, flowing the dispersion onto a foraminous support wire to provide a green board, dewatering the green board to form a dewatered green board, and drying the dewatered green board to provide a fibrous panel. In all embodiments, the pre-mixed slurry is substantially free of mineral filler.

Advantageously, the method of the disclosure decreases the water load needed to form the panel. A decrease in water load increases the rate of evaporation and drying of the board, which has a net reduction in the time, cost, and energy consumption needed to form a fibrous panel. Furthermore, the panels formed through the method of the disclosure have substantially equivalent performance as those formed through conventional industry processes.

As used herein, "green board" refers to the dispersion composition flowed onto the foraminous support at the outset of and through the gravity and vacuum dewatering steps. Accordingly, as used herein, "dewatered green board" refers to the green board after gravity and vacuum dewatering and prior to oven drying and "fibrous panel" refers to the dried composition after oven drying.

As used herein, the terms "base mat" and "fibrous panel" are used interchangeably. Furthermore, as used herein, the terms "panel," "board," and "tile" are considered interchangeable.

As used herein, the term "forming machine" refers to the fibrous panel production apparatus. The forming machine is comprised of a headbox and a forming section on which the dispersion of components is flowed and dewatered prior to drying in an oven to form a fibrous panel. The series of chests (or tanks) in which the components are mixed prior to being introduced to the headbox is separate from, yet may be fluidly coupled to, the forming machine through the headbox. The oven is also generally considered to be separate from the forming machine.

As used herein, the term "headbox" refers to the mixing chamber of the fibrous panel forming machine where the mixing of the pre-mixed slurry and the mineral filler slurry occurs, immediately prior to flowing the mixture onto the foraminous support wire and being dewatered. Other terms for headbox include, but are not limited to, "forming head" and "manifold wet end." It is appreciated that the term headbox is understood by a person of skill in the art as the final mixing location of the slurry of ingredients immediately before the slurry is flowed onto the foraminous support wire, dewatered, dried, and formed into a fibrous panel. Use of this terminology is not intended to limit the scope of the method in any way.

As used herein, the terms "continuous mixer" and "MARION MIXER" are used interchangeably. The continuous mixer, or MARION MIXER is a mixing device in which the slurry of mineral filler is formed by dispersing the mineral filler in water. The continuous mixer, or MARION MIXER of the disclosure may be fluidly coupled to the headbox of the forming machine, such that the mineral filler dispersion can be fed directly into the headbox. It is appreciated that the terms continuous mixer, and MARION MIXER are understood by a person of skill in the art as an industrial mixer and/or blender and other mixers and/or blenders may be used. Use of this terminology is meant to illustrate an embodiment of the invention and does not limit the scope of the method in any way.

As used herein, the terms "mineral wool" and "wool" should be considered interchangeable. Similarly, the terms "mineral filler" and "filler" should be considered interchangeable.

As used herein, "mineral wool" does not include a "mineral filler." As understood by one of ordinary skill in the art, mineral wool and mineral fillers are distinct components of the slurry, each of which is necessary to form a fibrous panel.

Green Board Composition

In all embodiments of the invention, the green board comprises a mineral wool, a binder, a cellulose, and a mineral filler. In all embodiments, the green board also comprises water. In embodiments, the green board also comprises a flocculent. In embodiments, the green board also comprises a colorant.

In all embodiments, the green board comprises a mineral wool. Mineral wool is comprised of fibers of inorganic raw materials. Mineral wool is a term broadly applied to various related vitreous products. In general, mineral wool is a fiberglass-like material composed of very fine, interlaced mineral fibers, somewhat similar in appearance to loose wool. It is composed primarily of silicates of calcium and aluminum, chromium, titanium, and zirconium. Typically, mineral wool is produced from natural rock or slag. Slag is a term broadly applied to refer to waste products of the primary metal and foundry industries, including deposits from the furnace lining charge impurities, ash from fuel, and fluxes used to clean the furnace and remove impurities. Generally speaking, although mineral fibers have an appearance that is similar to that of glass fibers, their chemical composition is significantly different than that of glass fibers due to the high content of iron, calcium, and magnesium and a relatively low proportion of silicon dioxide and aluminum.

The mineral wool may be of any of the conventional mineral fibers prepared from basalt, slag, granite, or other vitreous mineral constituent. Expressed in terms of percent by weight of the total dry solids content of the final panel product, the mineral wool constituent may be present in a range of about 10% to about 60%, about 10% to about 50%, about 12% to about 40%, about 12% to about 30%, about 15% to about 25%, about 17% to about 23%, or about 18% to about 22%, for example about 10%, about 14%, about 16%, about 18%, about 20%, about 25%, about 30%, about 35%, about 40%, about 45%, about 50%, about 55%, or about 60%.

In all embodiments, the green board also comprises a binder. The binder may include one or more of starch, latex, and reconstituted paper products. A combination of starch and reconstituted paper products has been found to provide useful properties, but of course other binder components and/or combinations can be used. Starch is a preferred organic binder because, among other reasons, it is relatively inexpensive. Typical starches include unmodified starches, including, but not limited to, unmodified corn starch.

Organic binders, such as starch, are often the primary component providing structural adhesion to the resulting panel. In embodiments, the binder is substantially free of latex. Expressed in terms of percent by weight of the total dry solids content of the final panel product, the binder may be present in an amount in a range of about 0.5% to about 20%, about 1% to about 18%, about 4% to about 16%, about 6% to about 14%, about 7% to about 13%, about 8% to about 12%, or about 9% to about 11%, for example, about 0.5%, about 1%, about 2%, about 4%, about 6%, about 8%, about 9%, about 10%, about 11%, about 12%, about 16%, or about 20%.

In all embodiments, the green board further comprises a cellulose. Cellulose, or cellulosic fiber, is an example of an organic fiber which provides structural elements to the final fibrous panel. Cellulosic fibers are typically provided in the form of recycled newsprint. Over Issued Newspaper (OIN) and Old Magazine (OMG) may be used in addition to, or as an alternative, to newsprint.

The cellulose may be any organic cellulosic fiber conventionally used in acoustic panels that acts as a structural element in the final panel product. Expressed in terms of percent by weight of the total dry solids content of the final panel product, the cellulose may be present in an amount in a range of about 5% to about 30%, about 5% to about 25%, about 10% to about 20%, about 10% to about 15%, about 11% to about 27%, or about 12% to about 16%, for example, about 5%, about 10%, about 12%, about 14%, about 16%, about 18%, about 20%, about 25%, or about 30%.

In all embodiments, the green board comprises a mineral filler. In all embodiments, the mineral filler is an expanded mineral filler. Suitable mineral fillers can include a lightweight inorganic aggregate of exfoliated or expanded glass origin, including, but not limited to expanded perlite, expanded vermiculite, expanded clay and the like. In embodiments, the mineral filler is selected from the group comprising expanded perlite, expanded vermiculite, expanded clay, and combinations thereof. In embodiments, the mineral filler comprises expanded perlite. In embodiments, the mineral filler is substantially free of gypsum.

Expressed in terms of percent by weight of the total dry solids content of the final panel product, the mineral filler may be present in an amount in a range of about 35% to about 85%, about 40% to about 80%, about 45% to about 75%, about 50% to about 70%, about 55% to about 65%, about 57% to about 63%, about 58% to about 60%, for example, about 35%, about 40%, about 45%, about 50%, about 55%, about 58%, about 59%, about 60%, about 61%, about 65%, about 70%, about 75%, about 80%, or about 85%.

In embodiments, the green board comprises a flocculent. Useful flocculents include, but are not limited to, aluminum chlorohydrate, aluminum sulfate, calcium oxide, ferric chloride, ferrous sulfate, polyacrylamide, sodium aluminate and sodium silicate. Expressed in terms of percent by weight of the total dry solids content of the final panel product, the flocculent may be present in a range of about 0.1% to about 3% by weight of panel and more preferably from about 0.1% to about 2%.

In embodiments, the green board comprises a colorant. Useful colorants include, but are not limited to, talc, titanium dioxide, zinc oxide and iron oxide.

In embodiments, the green board of the disclosure comprises about 15% to about 25% mineral wool, about 5% to about 15% binder, about 10% to about 15% cellulose, and about 50% to about 70% mineral filler, expressed in terms of percent by weight of the total dry solids content of the final panel product.

As used herein, "substantially free of" means that the composition does not contain significant amounts of the indicated component. Thus, incidental or background quantities of the indicated component (e.g., less than 0.5 wt %, less than 0.1 wt %, more preferably less than 0.05 wt %, based on the total solids content) may be present in the composition of the panel according to the disclosure and be within the scope of the disclosure.

Preparing the Green Board

When preparing the green board, the order of adding the mineral wool, cellulose, binder, optional flocculent and optional colorant to form a pre-mixed slurry is not particularly limiting. In embodiments, the starch and cellulose are first added to water and mixed, followed by the addition and mixing of the mineral wool. In all embodiments, the mineral wool, cellulose, and binder are mixed with water to achieve homogenous dispersion before the pre-mixed slurry is introduced into the headbox. The agitation speed used to mix the pre-mixed slurry is generally no greater than 60 rpm. The total mixing time to achieve a homogenous dispersion of the pre-mixed slurry from the time the components are combined until the slurry is fed to the headbox is in a range of about 30 minutes to about 3 hours, about 45 minutes to about 2.5 hours, about 1 hour to about 2 hours, about 1.5 hours to about 2 hours, for examples about 30 minutes, about 45 minutes, about 1 hour, about 1.5 hours, about 2 hours, or about 3 hours.

When preparing the mineral filler slurry, the dry mineral filler powder is added to the continuous mixer, or MARION MIXER and admixed with water to form a slurry. The total time of mixture to achieve a mineral filler slurry in the continuous mixer, or MARION MIXER is in a range of about 10 seconds to about 60 seconds, about 15 seconds to about 45 seconds, about 20 seconds to about 35 seconds, about 25 to about 30 seconds, for example about 10 seconds, about 20 seconds, about 30 seconds, about 45 seconds, or about 60 seconds.

Figure 2:
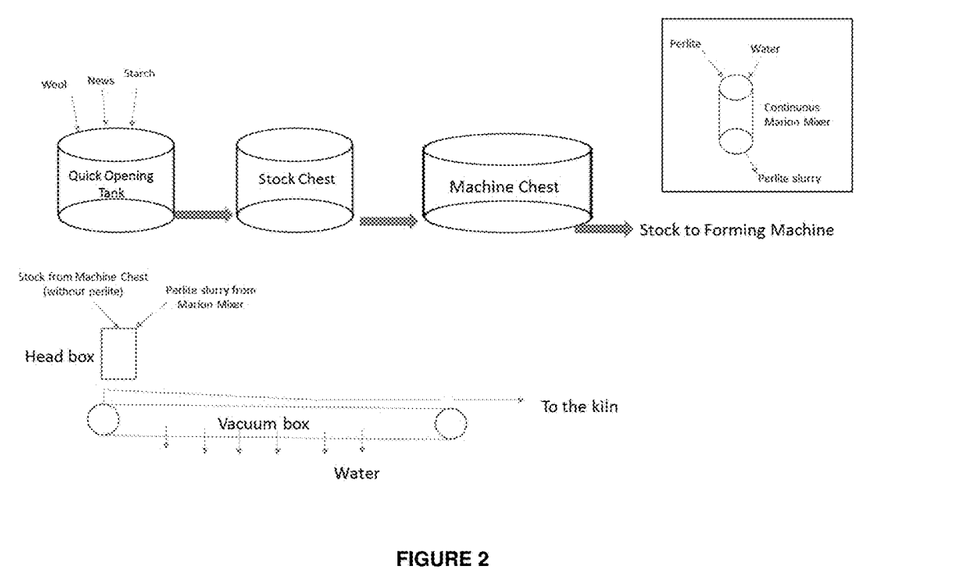
FIG. 2 is a diagram showing an embodiment of the method of the invention.

In embodiments, the mineral wool, the binder, and the cellulose are admixed together in a quick opening tank to provide the pre-mixed slurry. In embodiments, the pre-mixed slurry is then moved to the stock chest, passed to the machine chest, and lastly moved to the headbox, where the mineral filler slurry is injected from a continuous mixer, or MARION MIXER, as shown in FIG. 2. In embodiments, the agitation speed used to mix the pre-mixed slurry is no greater than about 60 rpm, for example, about 10 rpm, about 20 rpm, about 30 rpm, about 40 rpm, about 50 rpm, or about 60 rpm. In all embodiments, the mineral filler slurry is added to the pre-mixed slurry in the headbox, and mixed to form a dispersion before flowing onto the foraminous support wire for dewatering. The time of mixture of the pre-mixed slurry and the mineral filler slurry in the headbox is in a range of about 1 second to about 60 seconds, about 5 seconds to about 50 seconds, about 10 seconds to about 45 seconds, about 20 seconds to about 30 seconds, about 20 seconds to about 25 seconds, for example about 10 seconds, about 15 seconds, about 20 seconds, about 25 seconds, about 30 seconds, or about 45 seconds. In preferred embodiments, the pre-mixed slurry and mineral filler slurry are mixed in the headbox for about 25 seconds to form a dispersion before flowing onto foraminous support wire for dewatering.

The time of mixture of the pre-mixed slurry with the mineral filler slurry has been determined to be important for achieving the benefits according to the invention. When the mixing time of these slurries is conducted for more than about 25 seconds, there is no significant improvement (i.e. decrease) in the water load of the green board, as described in Example 2. But it should be understood that the headbox mixing time may be varied as mixing speeds, shear rates, fluid viscosities and other parameters related to the mixing process may also be varied while achieving the benefits of the invention; thus, the unexpected and surprising benefits of the invention may be achieved as long as mixing of the mineral filler with water is conducted in a separate chamber/tank and then introduced into the headbox prior to any significant degradation of the mineral filler in the separate chamber (which can be monitored by a significant change in viscosity requiring additional water usage), and final mixing of the mineral filler dispersion with the pre-mixed slurry comprising a mineral wool, a cellulose, and a binder is conducted within the headbox and the final dispersion is flowed onto a foraminous support wire screen prior to any significant change in viscosity requiring additional water usage. Generally, as used herein, a significant change in viscosity is a change of less than about 20%, less than about 15%, less than about 10%, or more preferably less than about 5%, for example, between 0% and 5%.

Without intending to be bound by theory, it is believed that mechanical degradation of the mineral filler causes an increase in water load, as the high shear of the mixing process breaks apart the mineral filler, exposing the cell cavities, and absorbing more water. Surprisingly, and without intending to be bound by theory, full degradation of the mineral filler occurs quickly during mixing, at which point there is neither recovery nor further degradation of mineral filler. The inventors have found that by introducing the mineral filler slurry directly from the continuous mixer, or MARION MIXER to the headbox, degradation can be minimized, causing significant reduction in the water load of the green board, for example, a reduction of about 5 wt % based on the total weight of the dewatered green board before entering the oven or kiln, in the production of the panels.

Dewatering

Acoustical panels can be prepared using the green board composition of the disclosure according to, for example, a wet felted production process, as illustrated in FIG. 1. One version of this process is described in U.S. Pat. No. 5,911,818, herein incorporated by reference in its entirety. In general, an aqueous slurry including a dilute aqueous dispersion of the green board composition of mineral wool, binder, cellulose, and mineral filler is delivered onto a moving foraminous support wire screen of a Fourdrinier-type mat forming machine from the headbox. The green board slurry is initially dewatered by gravity and the green board is further dewatered by means of vacuum suction. The dewatering process may further include the application of hot air. The dewatered green board is then dried in a heated oven or kiln to remove residual moisture and form dried base mats. Panels of acceptable size, appearance and acoustic properties are obtained by finishing the dried base mat. Finishing includes surface grinding, cutting, perforation, fissuring, roll/spray coating, edge cutting and/or laminating the panel onto a scrim or screen.

To provide lab-scale samples, the aqueous slurry of the dilute aqueous dispersion of the green board composition can be provided to a Tappi former, which comprises a similar process, albeit on a smaller scale, to the Fourdrinier-type forming machine. The green board slurry is dewatered by gravity followed by vacuum suction. The dewatering process may further include the application of hot air. The dewatered green board is then dried in the heated oven or kiln to provide a dried lab-scale base mat.

In embodiments, the method includes applying low vacuum pressure to the green board after gravity dewatering of the green board. Typically, the applied pressure is about 3 inHg (0.10 bar) to about 15 inHg (0.51 bar), but of course other pressures are possible. In embodiments, the application of a vacuum to the green board comprises a first vacuum step and a second vacuum step.

In embodiments, a vacuum of about 3 inches of mercury (inHg) to about 15 inHg may be applied to the green board. In embodiments, a first vacuum of about 3 inHg (about 0.10 bar) to about 7 inHg (about 0.23 bar), or about 4 inHg (about 0.13 bar) to about 6 inHg (about 0.20 bar), for example, about 3 inHg, about 4 inHg, about 5 inHg, about 6 inHg, or about 7 inHg may be applied, followed by a second, higher, vacuum of about 5 inHg (about 0.17 bar) to about 15 inHg (about 0.51 bar), about 6 inHg to about 14 inHg (about 0.47), about 7 inHg to about 13 inHg (about 0.44 bar), about 8 inHg (about 0.27 bar) to about 12 inHg (about 0.41 bar), or about 9 inHg (about 0.30 bar) to about 11 inHg (about 0.37 bar), for example, about 5 inHg, about 6 inHg, about 7 inHg, about 8 inHg, about 9 inHg, about 10 inHg, about 11 inHg, about 12 inHg, about 13 inHg, about 14 inHg, or about 15 inHg.

Optionally, a pressing step may be provided between the first vacuum step and second vacuum step. The green board may be pressed to achieve a desired thickness. Suitably, the thickness of the green board may be in a range of about 0.50 inches (about 1.3 cm) to about 0.75 inches (about 1.9 cm), about 0.60 inches (about 1.5 cm) to about 0.70 inches (about 1.8 cm), for example, about 0.55 inches, about 0.60 inches, about 0.65 inches, about 0.70 inches, or about 0.75 inches. In embodiments, the green board may have a solids content of about 22 wt % to about 28 wt % after pressing. In embodiments, the green board may have a solids content of about 25 wt % to about 40 wt %, or about 28 wt % to about 38 wt % after the second vacuum step.

In embodiments, hot air can also be applied during the dewatering step. The hot air can be supplied prior to or concurrently with the vacuum. In embodiments, the hot air is supplied concurrently with application of the vacuum. In embodiments comprising two vacuum steps, the hot air may be supplied concurrently with the application of the vacuum in both the vacuum steps. In embodiments comprising two vacuum steps, the hot air may be supplied concurrently with the application of the vacuum in at least the second vacuum step.

The hot air can be supplied in any suitable manner, for example, placing a heat source above the foraminous wire of a Fourdrinier-type mat forming machine or Tappi former. The hot air may be supplied at a temperature in a range of about 250° F. (about 120° C.) to about 500° F. (about 260° C.) or about 350° F. (about 177° C.) to about 400° F. (about 204° C.), for example, about 250° F., 300° F., 350° F., 400° F., 450° F., or about 500° F. The temperature of the hot air is not particularly limited, however, the temperature of the hot air should be below the melting temperature of the foraminous wire of the Fourdrinier-type mat forming machine.

In embodiments, the water load of the green board prior to entering the kiln is reduced by at least about 1 wt %, at least about 2 wt %, at least about 3 wt %, at least about 4 wt %, or at least about 5 wt %, in terms of the total weight of the board, when compared to green boards made by admixing the wool, cellulose, binder, and mineral filler together, as in conventional industry processes. Advantageously, a decrease in water load increases the rate of evaporation and drying of the board, which has a net reduction in the time, cost, and energy consumption needed to form a fibrous panel.

Drying

The method of the disclosure may further comprise a drying step. The dewatered green board may be dried in a heated oven or kiln.

The dewatered green board may be dried at any suitable temperature in the oven or kiln. In embodiments, the dewatered green board is moved to the oven and dried at elevated temperatures; typically, of about 250° F. (120° C.) to about 600° F. (315° C.), but of course other temperatures are possible. In embodiments, the dewatered green board may be dried at a temperature of about 250° F. (about 120° C.) to about 600° F. (about 315° C.), about 300° F. (about 120° C.) to about 600° F., or about 450° F. (about 230° C.) to about 550° F. (about 290° C.), for example, about 250° F., about 300° F., about 400° F., about 450° F., about 500° F., about 550° F., or about 600° F.

The drying step is generally the most time consuming and costly step of fibrous panel production. As the dewatered green boards may take hours to dry in the oven or kiln, the amount of fibrous panels produced is limited by the drying step. Accordingly, if less water present in the green board slurry composition, less water is needed to be removed during dewatering of the green board, and less energy is needed for the green boards to dry in the oven. Therefore, the base mats according to the invention are less costly to produce, and the number of fibrous panels produced can advantageously be increased (while using the same production facility capacity).

The method of the invention provides a decrease in water load needed to manufacture a fibrous panel by more than about 300 lbs/MSF.

Determination of Water Load

The water load of the green board refers to the pounds of water in 1000 square feet of green board, expressed in lbs/MSF. To determine the water load, the weight of a green board having a size of about 1.5 ft$^2$ was determined using a scale. The water load of a corresponding green board having an area of 1000 square feet is then calculated, and the resulting water load reported in lbs/MSF.

In embodiments, the method of the invention decreases the water load needed in the production of fibrous panels by at least about 100 lbs/MSF, at least about 150 lbs/MSF, at least about 200 lbs/MSF, at least about 250 lbs/MSF, at least about 300 lbs/MSF, or at least about 400 lbs/MSF.

Determination of MOR Value and Hardness Value

The MOR and Hardness values are determined according to ASTM C367 using an Instron machine, or equivalent. Briefly, test specimen are about 3" wide and 10" long. The supporting surface span is about 8". The load was applied at the center of the specimen at a crosshead speed of about 1.97 in/min until a failure occurred. The Modulus of Rupture is calculated according to the equation:

$$MOR = 3PL/(2bd^2)$$

wherein P is the maximum load in lbs, L is the length of span in inches, b is the specimen width in inches, and d is the specimen thickness in inches.

The compositions, panels, and methods in accordance with the disclosure can be better understood in light of the following examples, which are merely intended to illustrate the panels and methods of the disclosure and are not meant to limit the scope thereof in any way.

EXAMPLES

Example 1—Water Load Savings of the Invention

Two types of ceiling tiles were made in the laboratory. The first type of board used pre-mixed stock taken directly from a headbox of a forming machine The stock was mixed in the laboratory for 25 seconds at 70 Hz. This stock, designated "plant stock," represented the conventional process in which all ceiling tile ingredients, including mineral filler, were mixed together in the machine chest for a significant period of time.

The second type of board was made by first mixing binder and cellulose together for 25 seconds followed by the addition of mineral wool and mixing for an additional 25 seconds. The expanded mineral filler was added last and mixed for 25 seconds. Flocculent was added 15 seconds after the addition of the expanded mineral filler. The mixing speed was 70 Hz throughout all additions. This stock, designated "laboratory stock," represented the process of the invention.

Tiles were manufactured using general Tappi procedure and tested for water load and other physical properties. The boards made from the plant stock and laboratory stock were designated "Plant Mixed" and "Lab Mixed," respectively.

After gravity dewatering of the tiles, low vacuum (5 inHg) was applied for 25 seconds. After pressing to caliper, high vacuum (10 inHg) was applied. The mat weight before and after pressing and after final vacuum were recorded to calculate the percent dry at different stages. The boards were then dried in the oven for three hours at 300° F. followed by an additional 45 minutes at 500° F.

Two series of boards with four boards each were manufactured using each type of stock to match density. Results and board properties are shown in Table 1:

TABLE 1

| | Series | | | |
|---|---|---|---|---|
| | First Series | | Second Series | |
| | Board Type | | | |
| | Plant Mixed | Lab Mixed | Plant Mixed | Lab Mixed |
| Gravity Dewatering Time (s) | 9-10 | 4-5 | 9-10 | 4-5 |

TABLE 1-continued

| | Series | | | |
|---|---|---|---|---|
| | First Series | | Second Series | |
| | Board Type | | | |
| | Plant Mixed | Lab Mixed | Plant Mixed | Lab Mixed |
| Average Density (pcf) | 11.89 | 12.48 | 12.59 | 11.90 |
| Average Caliper (in) | 0.578 | 0.573 | 0.580 | 0.575 |
| Average Percent Dry (%) | 26.55 | 33.97 | 29.20 | 32.30 |
| Average Water Load (lbs/MSF) | 1584 | 1158 | 1475 | 1195 |
| Water Load Change (Plant to Lab) (lbs/MSF) | −389 | | −317 | |
| MOR (psi) | 153.2 | 131 | 151.2 | 120.6 |
| Hardness (lbs) | 161 | 162 | 175 | 158 |
| Air Flow Resistivity (MPa · s/m$^2$) | 1.89 | 1.34 | 1.89 | 1.05 |
| eNRC | 0.33 | 0.37 | 0.31 | 0.37 |

As shown in Table 1, the gravity dewatering time of the Plant Mixed boards was about two times longer than that of the Lab Mixed boards. Further, the percent dry of the Plant Mixed boards was much lower than that of the Lab Mixed boards. Though board density influences percent dry, the conversion to water load per MSF showed that for both density levels, the water load was decreased by more than 300 lbs/MSF. These data indicated an unexpected benefit of adding a dispersion of the expanded mineral filler in a final mixing process such that the composition including the expanded mineral filler was only mixed for a short time.

Example 2—Drying Time Savings of the Invention

A pre-mixed slurry of mineral wool, cellulose, and binder was acquired from the forming machine at a production facility. Dry expanded mineral filler powder was also acquired from the facility.

In the lab, boards were produced from three batches, each under different conditions.

In the first batch, the pre-mixed slurry and expanded mineral filler were mixed for 25 seconds at 70 Hz. Flocculent was added in the last 10 seconds. This batch is hereafter referred to as "Batch 1." This batch served as a control.

In the second batch, the pre-mixed slurry was mixed for 45 minutes at 80 Hz. Expanded mineral filler was added and mixed for 25 seconds at 70 Hz. Flocculent was added in the last 10 seconds. This batch is hereafter referred to as "Batch 2." Batch 2 represented the process of the invention.

In the third batch, the pre-mixed slurry and perlite were mixed together for 45 minutes at 80 Hz. Flocculent was added and mixed for an additional 25 seconds at 70 Hz. This batch is hereafter referred to as "Batch 3." This batch represented the conventional process of manufacturing a ceiling tile, as shown in FIG. 1.

Each batch was formed into a ceiling boards under laboratory conditions using the general Tappi procedure. However, press and high vacuum were not applied. The boards underwent gravity dewatering and were moved to the oven for drying. The boards dried for 3 hours at 300° F., followed by an additional 45 minutes at 500° F. Four boards were made from each batch.

Figure 3:
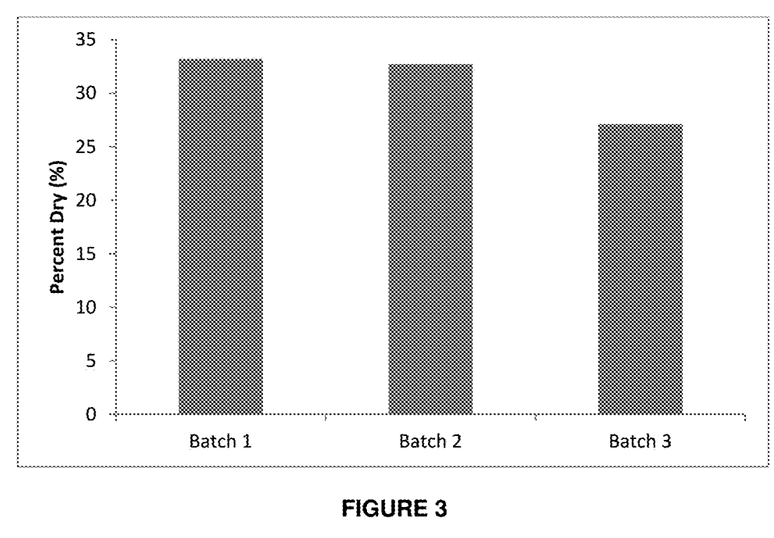
FIG. 3 is a graph illustrating the percent dryness of fibrous panels made from three different stock mixtures.

FIG. 3 shows that Batch 3 produced the board that was the least percent dry. These data surprisingly showed that when the expanded mineral filler was added last, less water was needed in the production of the board, and the board dried at a faster rate.

Figure 4:
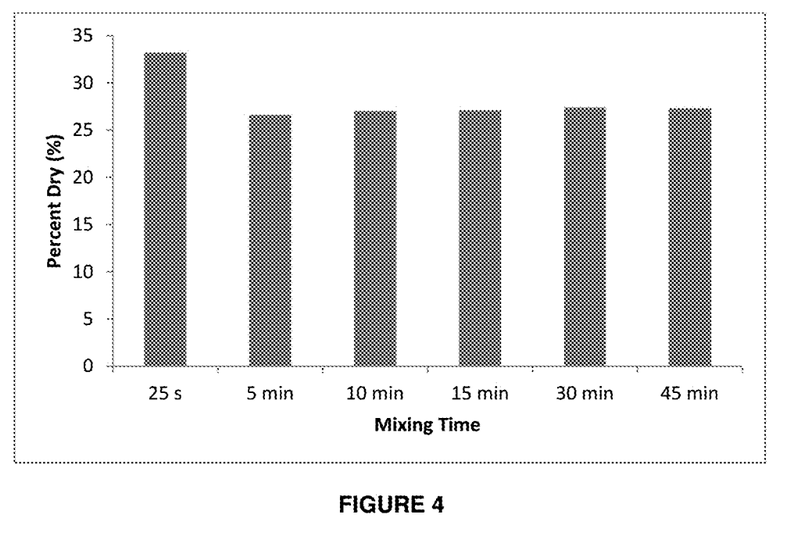
FIG. 4 is a graph illustrating the percent dryness of fibrous panels made after various mixing times of a stock mixture.

Additionally, the pre-mixed slurry and perlite were mixed together for various amounts of time at 70 Hz, and boards were produced for each time interval. As observed in FIG. 4, increased water load, in terms of decreased percent dry, occurred rapidly but leveled off after the first 25 seconds of mixing. Surprisingly, inventors unexpectedly found that increased water load, that is, the amount of water retained in the composition after the fibrous panel has been formed, was achieved rapidly and early in the mixing process of the composition.

Example 3—Effect of the Method

Four fibrous panels are made at the ceiling tile plant according the conventional industry procedures, as illustrated in FIG. 1. Additionally, four fibrous panels are made according to the method of the invention, as illustrated in FIG. 2.

Prior to entering the kiln, the water load of the dewatered green board made according to conventional procedures is calculated to be 100 g. The water load of the dewatered green board made according to the invention is calculated to be 95 g.

Accordingly, the method of the invention shows a 5 wt % decrease in water load as compared to the conventional industry procedure.

What is claimed:

1. A method of preparing a fibrous panel, comprising:
   admixing a mineral wool, a cellulosic fiber, and a binder with water to provide a pre-mixed slurry;
   admixing a mineral filler with water to provide a mineral filler slurry;
      introducing the pre-mixed slurry to a headbox of a forming machine;
      injecting the mineral filler slurry into the headbox and mixing with the pre-mixed slurry to form a dispersion;
      flowing the dispersion onto a moving foraminous support wire to provide a green board;
   dewatering the green board to form a dewatered green board and;
   drying the dewatered green board to provide a fibrous panel.

2. The method of claim 1, wherein the cellulosic fiber is selected from recycled newsprint, Over Issued Newsprint (OIN), Old Magazine (OMG), and any combination thereof.

3. The method of claim 1, wherein the cellulosic fiber is recycled newsprint.

4. The method of claim 1, wherein the cellulosic fiber is present in an amount between about 10% to about 15% by weight of the total dry solids content of the fibrous panel.

5. The method of claim 1, wherein the binder is selected from starch, reconstituted paper products, and any combination thereof.

6. The method of claim 1, wherein the binder is an unmodified corn starch.

7. The method of claim 1, wherein the binder is present in an amount between about 6% and 14% by weight of the total dry solids content of the fibrous panel.

8. The method of claim 1, wherein the mineral wool is present in amount between about 15% to about 25% by weight of the total dry solids content of the fibrous panel.

9. The method of claim 1, wherein the mineral filler is selected from expanded perlite, expanded vermiculite, expanded clay, and any combination thereof.

10. The method of claim 1, wherein the mineral filler is expanded perlite.

11. The method of claim 1, wherein the mineral filler is present in an amount between about 50% to about 70% by weight of the total dry solids content of the fibrous panel.

12. The method of claim 1, wherein the green board comprises a flocculent.

13. The method of claim 1, wherein the green board comprises a colorant.

14. The method of claim 1, wherein the dewatering comprises supplying hot air and applying a vacuum.

15. The method of claim 1, wherein the pre-mixed slurry is mixed for a period of time between about 30 minutes and about 3 hours before being introduced to the headbox.

16. The method of claim 1, wherein the mineral filler slurry is mixed for a period of time between about 10 seconds and 60 seconds before being injected to the headbox.

17. The method of claim 1, wherein the mineral filler slurry is mixed for a period of time between about 20 seconds and 40 seconds before being injected to the headbox.

18. The method of claim 1, wherein the pre-mixed slurry and mineral filler slurry are mixed in the headbox for a period of time between about 10 seconds and about 45 seconds.

19. The method of claim 1, wherein the pre-mixed slurry and mineral filler slurry are mixed in the headbox for a period of time between about 20 seconds and about 30 seconds.

20. The method of claim 1, wherein the pre-mixed slurry and the mineral slurry are mixed in the headbox for a period of time between about 20 seconds and about 25 seconds.

21. The method of claim 1, wherein the dispersion is flowed onto the moving foraminous support wire prior to the dispersion exhibiting any significant change in viscosity.

* * * * *